United States Patent [19]

Shinohara et al.

[11] Patent Number: 6,046,284
[45] Date of Patent: Apr. 4, 2000

[54] PHENOLIC HYDROXYL-CONTAINING RESIN BY REACTING EPOXY RESIN WITH EXCESS DIFUNCTIONAL PHENOL AND EPOXIDATION THEREOF

[75] Inventors: Shuya Shinohara; Nobuhisa Saitoh; Yasuyuki Takeda; Masayoshi Hanafusa; Hidenori Nozawa, all of Edogawa-ku, Japan

[73] Assignee: Tohto Kasei Co Ltd, Tokyo, Japan

[21] Appl. No.: 09/029,346

[22] PCT Filed: Jul. 2, 1997

[86] PCT No.: PCT/JP97/02293

§ 371 Date: Feb. 27, 1998

§ 102(e) Date: Feb. 27, 1998

[87] PCT Pub. No.: WO98/01494

PCT Pub. Date: Jan. 15, 1998

[30] Foreign Application Priority Data

Jul. 4, 1996 [JP] Japan ..................... 8-175219
Aug. 5, 1996 [JP] Japan ..................... 8-206100

[51] Int. Cl.⁷ ................ C08G 59/06; C08G 59/14; C08L 63/02
[52] U.S. Cl. ................ 525/523; 525/423; 525/481; 525/485; 525/486; 525/488; 525/510; 525/524; 525/526; 525/528; 525/533; 525/934
[58] Field of Search ............... 525/523, 423, 525/481, 485, 486, 488, 510, 524, 526, 528, 533, 934

[56] References Cited

U.S. PATENT DOCUMENTS 4,186,036 1/1980 Elms et al. ............... 525/396
5,405,931 4/1995 Kohno et al. ............ 525/524
5,407,978 4/1995 Bymark et al. .......... 525/523

FOREIGN PATENT DOCUMENTS 59-1525 1/1984 Japan.
WO 94/14867 7/1994 WIPO.

Primary Examiner—Robert E. Sellers

[57] ABSTRACT

A modified phenolic hydroxyl-containing resin having a low free difunctional phenol content and represented by general formula (1); a solid epoxy resin having an epoxy equivalent of 450 to 2,500 g/eq and prepared by epoxidizing the above resin; and another solid epoxy resin having an epoxy equivalent of 1,500 to 60,000 g/eq and a number-average molecular weight of 3,000 to 15,000 and prepared by reacting the above epoxy resin with a difunctional phenol compound. Resin compositions containing these resins have many applications as powder coatings and can paints. In formula (1), X represents a residue of a difunctional phenol compounds; X's may be the same or different; and n is the number of repeating units and is an integer of 0 or above.

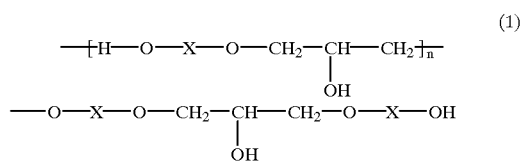

(1)

3 Claims, 5 Drawing Sheets

PHENOLIC HYDROXYL-CONTAINING RESIN BY REACTING EPOXY RESIN WITH EXCESS DIFUNCTIONAL PHENOL AND EPOXIDATION THEREOF

CROSS-REFERENCE TO RELATED APPLICATION

This application is the national phase of International PCT application PCT/JP97/02293, filed Jul. 2, 1997.

FIELD OF THE INVENTION

This invention relates to a modified resin composition containing phenolic hydroxyl group and a curable resin composition thereof. The invention further relates to the epoxy resin composition which is obtained by epoxidation of said modified resin composition containing phenolic hydroxyl group by epihalohydrin and a curable resin composition of said epoxy resin.

BACK GROUND OF THE INVENTION

In general, an epoxy resin composition is broadly applied as a component of paint or adhesive and for various uses such as electric fields or civil engineering because of the excellent chemical and physical properties which an epoxy resin composition originally has. However, the required level for the features of epoxy resin composition are becoming higher and higher along with the progress of each field of application. Especially, in the uses of powder coating, molding materials or paints for inside surface coating of a can, the development of a resin whose contents of lower molecular weight components is low is expected. For instance, since an epoxy resin powder coating has a good durability for corrosion and has a strong resistance to chemicals, it is practically used as the paint for an inner and an outer surface coating of a steel tube or as the paint for a steel frame coating.

Generally, as an epoxy resin composition, bisphenol A type solid epoxy resin is used and as a hardener, dicyandiamide, acid anhydride, aromatic amine, dihydrazide or phenol resin is used. As a phenol resin which is used as the hardener, a novolac type phenol resin, preferably the modified resin which has a phenolic hydroxyl group at both ends can be used. For instance, the composition obtained by a chemical reaction between a bisphenol type epoxy resin composition obtained by reacting bisphenol such as bisphenol A or bisphenol F with epichlorohydrin under the presence of hydroxide of alkali metal and excess bisphenol. As the modified resin which contains phenolic hydroxyl group, "TH-4100" produced by TOHTO KASEI, "EPICURE 171 and 172" produced by YUKA SHELL EPOXY and "XD-8062" of DOW CHMICAL are currently in the market. The powder coating which uses above mentioned modified resin as a hardener is disclosed, for instance, in Japanese Patent Laid-open publication 54-7473, Japanese Patent Laid-open publication 58-79011, Japanese Patent Laid-open publication 58-113267 and Japanese Patent Laid-open publication 61-12762, and these powder coating are remarkably improved so as to be applied to outer surface of a pipe. However, in these conventional modified resins which contains phenolic hydroxyl group, since from 5 to 20 wt % of bisphenol A used for the reacted remains, and vaporizes at a baking procedure, following two phenomena are pointed out as serious problems. That is, accompanied with the vaporization of bisphenol A, many tiny pin holes are formed on the surface of coated film and the physical properties of coated film is deteriorated, further the inside of a furnace for baking is polluted. Further, there is another problem that, by the vaporization of bisphenol A, the anticipated mixing ratio with epoxy resin is changed and deteriorates the physical properties of a coated film.

In the fields of powder coating and molding materials, conventional bisphenol type solid epoxy resins have a problem of blocking and deteriorate the stability of quality for storing, when a low epoxy equivalent resin is used. To solve the above mentioned problems, an epoxy resin not containing a low molecular component which causes a blocking problem, whose viscosity at molten state is low and has good fluidity has been expected.

As a method to remove low molecular weight component in solid type epoxy resin, for instance, the method to remove low molecular weight component by a molecular distillation is well known. However, even by this method, it is difficult to remove the low molecular weight component whose degree of polymerization (hereafter shortened to n) is bigger than 0, further the problem that the solid epoxy resin is thermally decomposed by high temperature at the procedure of distillation has been pointed out. Furthermore, since it is necessary to repeat a distillation for several times to remove n=0 component completely, this method is not useful for the industrial utilization. In the document of Japanese laid open publication of 61-231018, the method to remove the low molecular weight component by contact with a hydrocarbon solvent such as xylene is reported, however by this method it is difficult to remove n=0 component selectively and components bigger than n=0 are also removed and also the removing effect of n=0 component is not sufficient. In Japanese patent laid open publication 1-230678, the refined bisphenol type epoxy resin from which low molecular weight component i.e. lower than 800 is reduced or removed by contacting high molecular weight epoxy resin having 2000 to 6000 number-average molecule weight with lower alcohol in an affinity solvent is disclosed. This method is suited to a high molecule epoxy resin containing smaller than 2% of n=0 or n=1 lower molecule components, and the removing effect is not complete. The removing of these lower molecule components is not complete, even after 5 times repetition of rinsing procedure by alcohol, and is not an useful method as an industrial use.

From the view point of sanitation, an epoxy resin composition which does not contain low molecular weight composition is expected. In general, for the use of inside surface coating of a can for beverage, an epoxy/phenol type coating, an epoxy/amino resin coating and an epoxy/urea resin coating are used.

However, recently, kinds of beverage to be packed in a can have become more diverse. Green tea, oolong tea and black tea are becoming more popular as a beverage to be packed in a can. Since these kinds of beverage are heat treated by high temperature (retort treatment) after being packed into cans, components of coating are partially dissolved at this procedure and the lasting of flavor of contents is spoiled. As a coating which has good durability to bending at the can production, a polyvinyl-chloride organo# sol coating is usually used. However this coating has a problem of sanitation caused by monomer and plasticizer residue, and also has an environmental problem caused by chlorine gas generated when the wasted cans are burned. Therefore, a development of epoxy resin coating which has good durability to bending and an excellent feature for lasting of flavor is desired.

The objects of this invention is to provide a modified resin containing phenolic hydroxyl group [A] which does not contain a vaporizing component at a baking procedure and a curable resin composition thereof; a solid epoxy resin [B] which does not contain a low molecular weight component and has a good fluidity and a curable resin composition thereof; and a low molecular weight component free epoxy resin [C] which forms a coating having good durability to bending and an excellent feature for lasting of flavor and a curable resin composition thereof.

DISCLOSURE OF THE INVENTION

The important points of this invention include, a modified phenolic hydroxyl group containing resin having a low free difunctional phenol content comprising a resin [A] of formula (1), said resin having a phenolic hydroxyl group equivalent of from 300 to 1,200 g/eq; and, wherein residues of unreacted difunctional phenol is less than 5% by weight of resin, and a curable composition (a) comprising the modified phenolic hydroxyl group containing resin and an epoxy resin as the necessary components;

an epoxy resin which is solid at room temperature [B] and which comprises the product of epoxidizing the modified resin with epihalohydrin, said epoxy resin having an epoxy equivalent in the range of from 450 to 2,500 g/eq and a curable resin composition (b) comprising the solid epoxy resin and a hardener;

an epoxy resin [C] which is solid at room temperature comprising the product obtained by the reaction of said solid epoxy resin and difunctional phenol, said product having an epoxy equivalent of from 1,500 to 60,000 g/eq and a number-average molecule weight of from 3,000 to 15,000; and an epoxy resin (c) characterized by a potassium permanganate consumption value smaller than 5 mg O/L, whereis said value is measured on extracted water which is prepared by adding, by a ratio of 1 ml water to 5 cm2 area of unreacted dry film having a thickness of about 10 μm; and heat treated at 125° C. at high pressure for 1 hour in a sealed bottle and curable resin composition comprising said solid epoxy resin and a hardener.

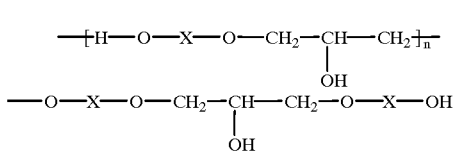

(1)

(in forrnula (1), X represents a residue of difunctional phenol and n is 0 or a positive integer and wherein the X's at different positions may be the same or different)

The modified resin containing phenolic hydroxyl group [A] represented by above mentioned formula (1) can be produceed by a taffy method which reacts difunctional phenol with epihalohydrin or by a fusion method which reacts epoxy resin with difunctional phenol. Said two methods can be preferably used. In a case of the taffy method, the modified resin [A] can be obtained by reacting epichlorohydrin with excessive difunctional phenol in the presence of sodium hydroxide catalyst, then removing unreacted difunctional phenol. Meanwhile, in a case of the fusion method, the modified resin composition [A] can be obtained by reacting epoxy resin with excessive difunctional phenol, then removing unreacted difunctional phenol residue. The phenolic hydroxyl group equivalent of the modified resin obtained by the direct and fusion method is desirably in the region of from 300 to 1200 g/eq; further, the residue of difunctional phenol is desirably smaller than 5 wt %. From the industrial view point, since the modified resin whose hydroxyl group equivalent is smaller than 300 g/eq and bigger than 1,200 g/eq is difficult to produce, the desirable region of hydroxyl group equivalent is from 350 to 800 g/eq and is more desirably from 400 to 700 g/eq. If the residue of difunctional phenol is bigger than 5 wt %, the physical property of curable composition is affected, therefore the amount of residue is desirably smaller than 1 wt %, and more desirably smaller than 0.5 wt % and furthermore desirably smaller than 0.1 wt %.

As the difunctional phenol to be used for the synthesis of the modified resin containing phenolic hydroxyl group of this invention, bisphenol A, bisphenol F, bisphenol S, tetrabromobisphenol A, bisphenol AD, bisphenol C, catechol, resorcin, hydroquinone and others can be mentioned. Further, as the difunctional epoxy resin, the epoxy resin epoxidated using at least one kind of these difunctional phenol, hydrogenated bisphenol A, 1,6 hexanediol, diglycidlethers of alcohol such as polypropyleneglycol, hexahydrophthalic acid, diglycadlesters such as dimer acid and others can be mentioned, and especially a bisphenol type epoxy resin is desirably used. As the bisphenol type epoxy resin, a lower molecular weight type which is obtained by a taffy method is desirably used, and especially a liquid epoxy resin of bisphenol A type or bisphenol F type which is on the market as the general liquid type is desirable.

To obtain the modified resin containing phenolic hydroxyl group by the taffy method, excessive difunctional phenol is reacted with epichlorohydrin. Mole number of difunctional phenol to be added is from 1.2 to 10 mole, desirably from 1.5 to 5 mole to 1 mole of epichlorohydrin. When the mole number of difunctional phenol is smaller than 1.2 mole, the molecular weight of obtained resin becomes too high. When it is bigger than 10 mole, the residue of difunctional phenol become too much to be removed and the commercial production becomes impossible. Further, mole number of sodium hydroxide to be added is from 0.7 to 1.2 mole to 1 mole of epichlorohydrin and is treated as the solution from 8 to 15% concentration by weight. The taffy reaction can be carried out within the limit of temperature from 40 to 120° C. for 1 to 8 hours. Furthermore, said reaction can be carried out in a solution which does not react with epoxy group. As the substantial examples of this solution, aromatic hydrocarbons such as toluene, xylene or benzene, ketones such as methylisobutylketone, methylethylketone, cyclohexanone or acetone, glycolethers such as diethyleneglycolmethylether, propyleneglycolmethylether or dipropyleneglycolmethylether, aliphatic ethers such as diethylether, dibutylether or ethylpropylether or alicyclic ethers such as dioxane or tetrahydrofuran can be mentioned.

To obtain the modified resin containing phenolic hydroxyl group by the fusion method, excessive difunctional phenol is reacted with epoxy resin. As in the direct method, mole number of difunctional phenol to be reacted with 1 mole of epoxy resin is from 1.2 to 10 mole, desirably from 1.5 to 5 mole. As the difunctional phenols which are used for the fusion method, one or more kinds of afore# mentioned phenol can be used. When the mole number of difunctional phenol is smaller than 1.2 mole, the molecular weight of obtained resin becomes too high and consequently the fluidity of molten stage is deteriorated. When it is bigger than 10 mole, the residue of difunctional phenol become too much to be removed and the commercial production becomes impossible. At the reaction, epoxy resin and difunctional phenol can be put in simultaneously, or epoxy resin can be added slowly into difunctional phenol. Further, the reaction can be carried out under the presence of catalyst within the limit of temperature from 30 to 220° C. for 30 minutes to 6 hours, desirably from 80 to 160° C. for 1 to 6 hours. As the catalyst, metal hydroxide such as sodium hydroxide or potassium hydroxide, tertially amines such as 2-methylimidazole or 2-ethyl 4-methyl-imidazole, quaternary ammonium salts such as tetramethyl-ammoniumbromide or benzyltrimethylammoniumbromide, phosphines such as triphenylphosphine or tributylphosphine, phosphonium salts such as n-butyltriphenylphosphonium-bromide can be mentioned. The desirable amount of catalyst to be added is from 10 to 10,000 ppm to difunctional phenol used at the reaction. As in the direct method, the reaction can be carried out in a solution, and the point when the epoxy group is vanished is regarded as the end point of the reaction.

After the reaction, as a method to remove the residue of unreacted difunctional phenol, a method by solvent extraction, a method by recrystallization, a method by molecular distillation, a method by separating film, a removing method by dissolving in alkali aqueous solution and others can be mentioned. From the industrial view point, a molecular distillation or a dissolving method in alkali aqueous solution are preferably used. The removing method by dissolving in alkali aqueous solution is illustrated as follows. After the direct or indirect reaction, afore# mentioned solution is added by the amount so as the solid portion to be diluted to 20~50 wt % concentration, then an alkali metal hydroxide is added, reacted with the residue of difunctional phenol and alkali metal phenolate is formed. Molar number of alkali metal hydroxide to be added corresponds to 0.7 to 1.5 mole to 1 mole of phenolic hydroxide group of difunctional phenol which is unreacted with the formed modified resin having phenolic hydroxide group at the end. The reaction is carried out at the temperature of 30~100° C., for 10 minutes to 5 hours. Then, only alkali metal phenolate of difunctional phenol is separated and removed from the high molecular product which is dissolved in the solution. As an alkali metal hydroxide, an aqueous solution of sodium hydroxide or potassium hydroxide whose concentration is smaller than 15 wt % may be used. When the concentration of aqueous solution is bigger than 15 wt %, difunctional phenol is deposited. The desirable limitation of concentration is from 2 to 13% by weight. Almost whole residue of difunctional phenol can be removed by one separating operation. After the removal of difunctional phenol residue, the product is neutralized by phosphoric acid or sodium phosphate and rinsed by fresh water, and the solvent is distilled out. Thus, the solid modified resin containing phenolic hydroxide group [A] whose phenolic hydroxide equivalent is from 300 to 1200 g/eq and in which difunctional phenol does not substantially is obtained.

The distinctive feature of curable composition [a] of this invention is the use of said modified resin containing phenolic hydroxide group [A] with the epoxy resin as a hardener. As the epoxy resin there can be used, the epoxy resin which contains at least two epoxy groups in a molecule and whose melting point is from 50 to 140° C., which is usually used as a powder coating. For example, bisphenols such as bisphenol-A and bisphenol-F, novolac type polyglycidylether such as di-glycidylether, phenolnovolac and cresolnovolac, polyglycidylester of polycarboxylic acid and alicyclic epoxy resin can be mentioned, and one kind or a mixture of these compounds can be used.

As the modified resin containing phenolic hydroxide group [A] which is used as a hardener of the curable composition [a] of this invention the compound whose phenolic hydroxyl equivalent is 300 to 1,200 g/eq is desirable and 400 to 700 g/eq is more desirable. The desirable region of softening temperature is from 50 to 140° C. and more desirable region is from 80 to 120° C. The desirable region of the amount for use of modified resin containing phenolic hydroxide group is from 0.6 to 1.5 phenolic hydroxyl equivalent, more desirably from 0.6 to 1.0 equivalent to 1 epoxy group equivalent of epoxy resin. Further, as a hardener, acid anhydride or polyamine which are usually applied to a powder coating can be used together with the modified resin of this invention as needed.

To the curable composition [a] of this invention, a color pigment such as titanium oxide or carbon black, an extender such as calcium carbonate or talc, a rust preventive pigment such as zinc powder or aluminum phosphate, a filler material for reinforcement such as glass flakes or glass fiber, cure actuator such as 2-methylimidazole or triethylphosphine, a flow control agent and a dispersing agent which are usually used in a powder coating and an ultraviolet absorber can be added.

The curable composition [a] of this invention can be obtained by melting and mixing an epoxy resin, a modified resin containing phenolic hydroxide group and other additives as needed at the temperature of 80~120° C., then cooling down and crushing the solidified mixture. As the melting and mixing apparatus, a heating roller, a heating kneader or an extruder can be used. And the powder coating compound of this invention can be coated on the surface of an article by means of an electrostatic painting method, fluidizing-bed coating method or others. The powder coating compound of this invention can be applied to a reinforcement, a steel pipe and a deformed bar. The baking and curing condition of the coated film is 180~240° C. temperature for 1~30 minutes and the article to be coated can be previously heated before coating.

The modified phenolic hydroxyl group containing resin of this invention [A] can be epoxidated by well known method which epoxidates a resin by epihalohydrin in the presence of alkali metal hydroxide, and a solid epoxy resin [B] which has 450~2500 g/eq epoxy equivalent value can be obtained. As the kind of epiiodohydrin to be used in this application, epichlorohydrin, epibromohydrin and epiiodidehydrin can be mentioned and especially epichlorohydrin can be preferably used. As the alkali metal hydroxide, sodium hydroxide can be preferably used. Excessive amount of epihalohydrin of 2~30 mole, desirably 10~20 mole is added to 1 mole of phenolic hydroxide group of material resin, and the amount of alkali metal hydroxide to be used is from 0.7 to 1.1 mole to phenolic hydroxide group equivalent of material. It is desirable to react at the temperature from 40 to 120° C. region while removing the generated water.

After the reaction, the excess epihalohydrin is vaporized off, then the reacted product is dissolved into afore# mentioned solvent, and purifying reaction is made by adding 1 to 50 mole of alkali metal hydroxide to the hydrolyzable chlorine of generated epoxy resin. By removing byproduct salt by washing with water or by filtration and removing solvent by vaporization, the epoxy resin [B] which is solid at room temperature whose epoxy equivalent is from 450 to 2,500 g/eq can be obtained. The epoxy resin whose epoxy equivalent is smaller than 450 g/eq has a problem of productivity at the production of solid resin, and the epoxy resin whose epoxy equivalent is bigger than 2,500 g/eq is difficult to remove the solvent after epoxidation.

Since the epoxy resin [B] which is solid at room temperature of this invention does not contain low molecular weight component, and further since the proportion of high molecular weight component can be decrease, the distribution of molecular weight is sharper than that of well known solid epoxy resin. The viscosity of the epoxy resin in the molten state is low and the glass transition temperature of it becomes higher, further it has a good resistance to blocking and has a good fluidity.

The curable composition [b] of this invention is composed at least by said solid epoxy resin [B] and a hardener. As the hardener, conventional hardeners which are used for hardening of an epoxy resin can be used. For instance, amines such as diethylenetriamine, triethylenetriamine, isophoronediamine, methaxylenediamine or diaminodiphenyl-methane, acid anhydride such as phthalic anhydride, hexahydro phthalic anhydride, nadic anhydride and trimellitic anhydride, polyester resin having acid finctional end group, aminopolyamide resin which is a condensation product of dimer acid between diethylenetriamine or triethylamine, polysulfido resin which has mercaptan group at the end, boron trifluoride amine complex, novolac resin obtained by condensation reaction between phenols and formalin, any kind of compound which has phenolic hydroxyl group, dicyandiamide, adipic dihydrazide, organic acid dihydrazide such as sebacic dihydrazide, polyisocyanates, imidazoles, resol phenol resin and amino resin can be mentioned.

To the curable composition [b] of this invention, at least one kind of conventional epoxy resin selected from the group mentioned below can be added at need. That is, for instance, polyglycidylether of bisphenols such as bisphenol A and bisphenol F, polyglycidylether of alcohol such as polyethyleneglycol or polypropyleneglycol, polyglycidylester of hexahydrophtalic acid or dimer acid, polyglycidylamine such as diaminodiphenylmethane and novolak type polyglycidylether such as phenol novolak or cresol novolak can be mentioned. Further, a filler, a diluent or an accelerator can be added at need. The curable composition [b] of this invention can be used for various uses, for instance as a coating such as an anti-corrosive paint, powder coating, PCM paint or canned paint, an use to a civil engineering and construction industry, material as an adhesive, an use to an electric and electronics industry component such as an electric insulation (powder type) or a virtual adhesive for semiconductor chip or as a composite such as a laminate (printed circuit board) or a carbon fiber reinforced plastic (CFRP).

By addition polymerization reaction between solid epoxy resin [B] and difunctional phenol, an epoxy resin which is solid at room temperature [C] whose epoxy equivalent is from 450 to 2,500 g/eq and a number-average molecular weight is from 3,000 to 15,000 can be obtained. This solid epoxy resin [C] is an epoxy resin of high molecular weight which does not contain water extractive low molecular weight component. Therefore, a distinctive feature of this resin is that the potassium permanganate consumption value measured on extracted water is smaller than 5 mg O/L. This extracted water is prepared by following procedure; add distilled water to the coated resin film by the proportion of 1 ml of distilled water to 5 $cm^2$ area of unreacted dry film of said uncured resin having 10 $\mu$m thickness, heated in sealed bottle at the temperature of 125° C. for 1 hour, and the obtained extracted water is used for the measurement. Therefore, said solid epoxy resin [C] is suited for the use of an inner surface coating of canned beverage, which requires good hygiene and good maintenance of flavor.

As the difunctional phenol which can be used for addition polymerization, bisphenol A, bisphenol F, bisphenol S, tetrabromobisphenol A, bisphenol AD, bisphenol C, catechol, resorcinol or hydroquinone can be used, and one kind or the mixture of more kinds of these can be used. Among those, bisphenols such as bisphenol A and bisphenol F is desirably used.

Generally, the addition polymerization can be completed in the presence of catalyst by reacting at the temperature of 80~220° C. for from 30 minutes to 20 hours. As the catalyst, same kinds and same amount of catalysts which are used in the case of said modified phenolic hydroxyl group containing resin [A] can be desirably used. That is, alkali metal hydroxides, tertiary amines, imidazoles, quaternary ammonium salts, phosphines or phosphonium salts can be mentioned. At the preparation of solid epoxy resin [C], the reaction can be carried out in the solvent which does not react with epoxy group. As the substantial examples of this solution, aromatic hydrocarbons such as toluene, xylene or benzene, ketones such as methylisobutylketone, methylethylketone, cyclohexanone or acetone, glycolethers such as diethyleneglycolmethylether, propyleneglycolmethylether or dipropyleneglycolmethylether, aliphatic ethers such as diethylether, dibutylether or ethylpropylether or alicyclic ethers such as dioxane or tetrahydrofuran can be mentioned.

Epoxy equivalent of solid epoxy resin [C] of this invention is desirably to be in the region from 1,500 to 60,000 g/eq. When the epoxy equivalent is smaller than 1,500 g/eq, processsbility after being coated is not sufficient and when it is bigger than 60,000 g/eq, the production in industrial scale becomes very difficult. And when the number-average molecular weight is smaller than 3,000, processability after being coated is not sufficient and when it is bigger than 15,000, the production in industrial scale becomes very difficult.

As the hardener component of the curable composition [c] of this invention, generally a substance which is used as a hardener of epoxy resin can be used, especially, resol resin and amino resin are desirable. As the resol resin, for instance, a condensation product of phenols such as phenol, alkyl phenols or bisphenols with aldehydes such as formaldehyde or acetoaldehyde under the presence of basic catalyst and alkyletherficated compound of it with alcohols such as methanol, n-butanol or isobutanol can be mentioned. On the other hand, as the amino resin, a condensation product of urea, melamine or benzoguanamine with formaldehyde in the presence of basic catalyst and alkyletherficated compound of it with alcohols can be mentioned.

At the production of the curable composition [c] of this invention, one kind alone or a mixture of more kinds of these hardener components can be used in accordance with need. And the blending amount of the curable composition [c] is to be within the region from 1 to 50% by weight to the total weight of compound. When the blending ratio of the curable composition [c] is smaller than 1 wt %, the cross linkage of resin is not sufficient and a retort resistance of coated film is not good, and when it is bigger than 50 wt %, the processing and bending feature of it are not good. The curable composition [c] of this invention can be used without solvent or by dissolving it in solvent at need. Any kind of solvent which can dissolve the composition homogeneously can be used.

The curing composition [c] of this invention can be used as the water soluble paint, by dispersing said solid epoxy resin [C] in water by well known method, for example, a method to partially esterfy it with the acrylic resin which has carboxylic group in the presence of esterfying catalyst, or a method to copolymerize with unsaturated monomer which has carboxylic group in the presence of free radical generating agent.

The curable composition [c] of this invention can be used together with a reaction accelerating agent at need, for example, a curing catalyst such as phosphoric acid or paratoluenesulfonic acid. Further, to the curable composition [c] of this invention, various additives which are usually used in epoxy resin coating such as a filler, a reinforcing agent, a pigment or fluid controlling agent can be added at need.

As the method to coat the curable composition [c] of this invention, the well known method such as a spray method, a roll coating method, a method by brush or a method by pouring can be mentioned. In general, the curable composition [c] of this invention is baked at the temperature from 120 to 300° C. for 30 seconds to 20 minutes and the coated film can be obtained.

BRIEF ILLUSTRATION OF THE DRAWING

FIG. 3 is a chart indicating Infra Red spectrum of this modified phenolic hydroxyl group containing resin [A-1], while

Figure 3:
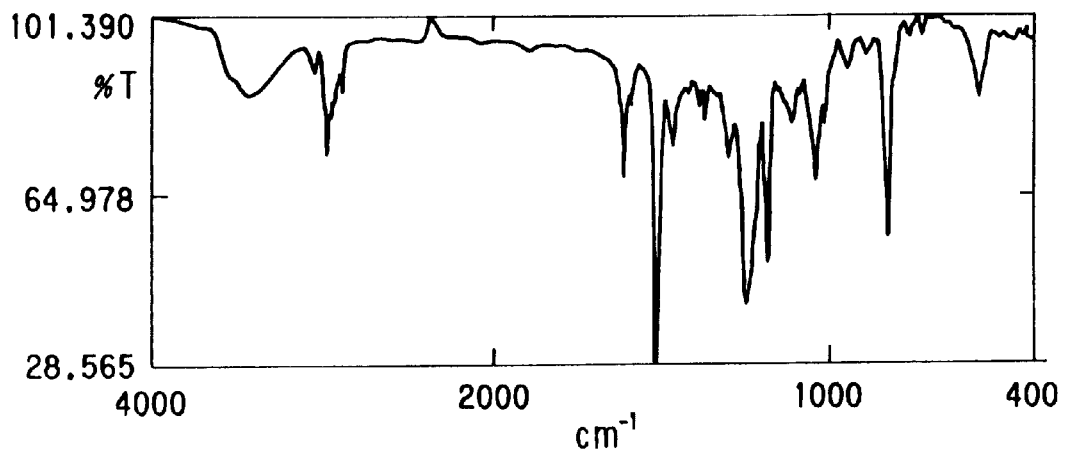
Figure 4:
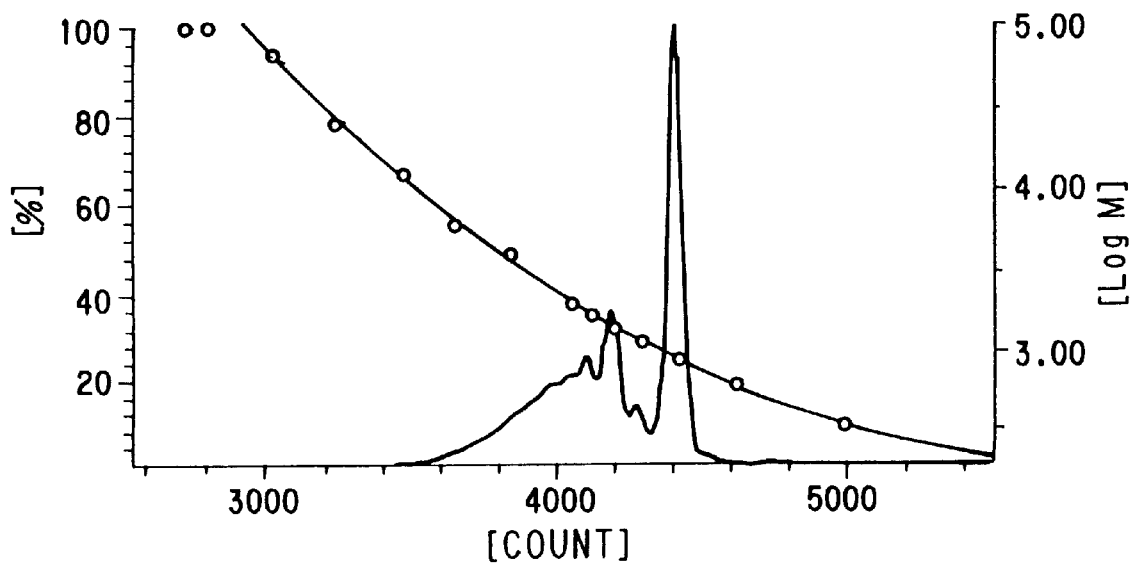
FIG. 4 is a GPC chart of the solid epoxy resin [B-1] obtained in Example 5.
Figure 5:
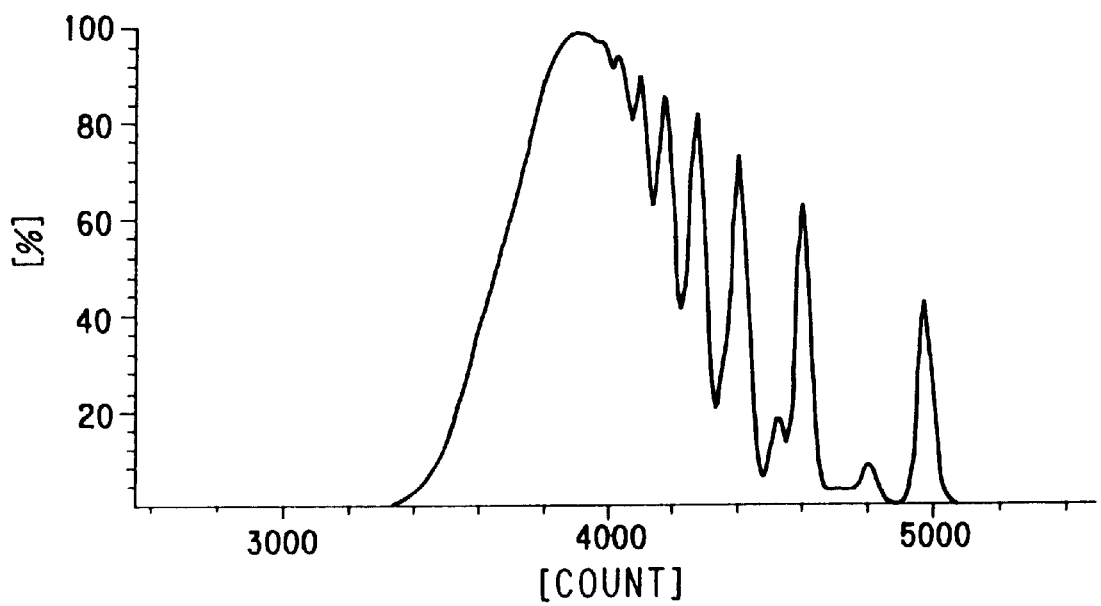
FIG. 5 is a GPC chart of the solid epoxy resin of Comparative Example 4.

In FIGS. 1, 2, 7 and 8, the vertical axis indicates amount of response (mV) and horizontal axis indicates the eluting time (min). In FIGS. 4 and 5, the vertical axis indicates amount of response (%) and horizontal axis indicates eluting time (count number). Furthermore, in FIGS. 1, 4, 5 and 7, the eluting time (horizontal axis) in calibration curve and logarithms of the molecular weight (vertical axis; log M) are plotted concurrently. Further, in FIGS. 3, 6 and 9, the vertical axis indicates transmittance and the horizontal axis indicates wave length.

THE BEST EMBODIMENT TO CARRY OUT THE INVENTION

The present invention will be understood more readily with reference to the following Examples, however, these Examples are intended to illustrate the invention in detail and are not to be construed to limit the scope of the invention. And in all Examples and Comparative Examples, parts of proportion of each components are indicated by parts by weight.

EXAMPLE 1

Figure 1:
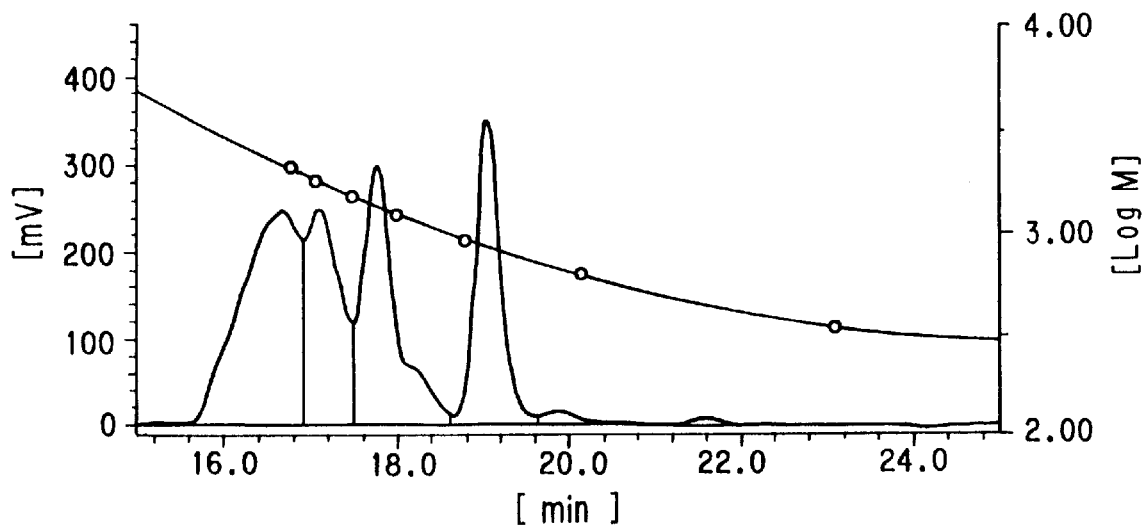
FIG. 1 is a GPC chart of the modified phenolic hydroxyl group containing resin obtained in Example 1 [A-1]

In a reacting vessel equipped with a stirrer, a thermometer and a cooling tube, 300 parts of YD-128 (Product of TOHTO KASEI; epoxy equivalent is 186 g/eq, viscosity is 12500 MPa·s/25° C.) as an epoxy resin, 364.9 parts of bisphenol A as a difunctional phenol are added. After molten at 120° C., 0.2 parts of triphenylphosphine is added as a catalyst and reacted at 170° C. for 3 hours. 1666 parts of methylisobutylketone and 1156 parts of 6.6% aqueous solution of sodium hydroxide are added, stirred at 90° C. for 30 minutes then settled down, and the aqueous layer is separated. Further, the solution containing resin is neutralized by phosphoric acid, rinsed by water, methylisobutylketone is vaporized off, then light yellow coloured modified resin composition containing phenolic hydroxyl group [A-1] is obtained. The hydroxyl group equivalent of obtained resin is 664 g/eq, the softening point is 105° C. and the residue of difunctional phenol (bisphenol A) is less than 0.1%. In this Example, the hydroxyl group equivalent is measured by following procedure. In the mixture solution of tetrahydrofuran and methanol 3 wt %, tetramethylammoniumhydroxide is acted upon phenolic hydroxyl group and develops color. Transmittance at 305 nm is measured by a spectrophotometer and the hydroxyl group equivalent is calculated by converting the transmittance value using the calibration curve, which is prepared by same procedure using the standard difunctional phenol (bisphenol A) used as starting material. The softening point is measured by JIS K-7234 method, and the residue of difunctional phenol is measured by GPC analysis. FIG. 1 is a GPC chart of said modified resin composition containing phenolic hydroxyl group [A-1] and FIG. 3 is a chart indicating infra red spectrum transmittance of it.

EXAMPLE 2

In the same reacting vessel of Example 1, 200 parts of YD-128 and 608 parts of bisphenol A are added. After molten at 120° C., 0.2 parts of triphenylphosphine is added and reacted at 150° C., for 5 hours. 1153 parts of methylisobutylketone and 1908 parts of 10.7% aqueous solution of sodium hydroxide are added, stirred at 90° C. for 30 minutes then settled down, and the aqueous layer is separated. Further, the solution containing resin is neutralized by phosphoric acid, rinsed by water, methylisobutylketone is vaporized off. The hydroxyl group equivalent of obtained resin [A-2] is 435 g/eq, the softening point is 97° C. and the residue of bisphenol A is less than 0.1%.

EXAMPLE 3

100 parts of bisphenol A type solid epoxy resin EPO TOHTO YD-014 (product of TOHTO KASEI; epoxy equivalent is 950 g/eq, softening point is 100° C.), 49 parts of modified resin containing phenolic hydroxyl group [A-1] obtained in Example 1, 1.0 part of 2-methylimidazol, 40 parts of titanium oxide and 0.8 parts of MODAFLOW as a fluid controlling agent are blended in dry condition, then melt kneaded by an extruder (IKEGAI TEKKO, PCM-30). After cooled down, mulled to fine particles and a powder coating composition [a-1] is obtained.

The obtained powder coating composition is coated by powder electrostatic painting method over the surface of steel plate (150×70×1.2 mm) whose surface is processed by sand blast and is previously heated to 240° C., then the specimen having about 200 μm film thickness is obtained.

An appearance, a resistance to impact, a cathode exfoliation and a resistance to corrosion are measured and the obtained results are shown in table 1. The measuring methods are illustrated as follows.

Appearance

◯: good

Δ: slightly inferior (few pin holes are observed)

X: inferior (many pin holes are observed)

Resistance to impact

The coated test piece board is cooled down to 0° C., and −20° C., and the resistance to impact at these temperature is measured by Gardner tester.

Cathode peeling test

Measured by ASTM G-8 method. Use 3% aqueous solution of sodium chloride and the electric current is charged at 6 volt. After 30 days the resulting coating is peeled compulsory by knife. The numerical values in Table 1 are the averaged value the width measured in compulsory peeling of 8 directions from the coated film deficit portion of 5 mm Φ which locates at the center of test piece.

Resistance to corrosion

Cross cut line is marked on the surface of coated test piece and tested by anti salt water spray method disclosed in JIS K 5400. After being sprayed with salt water for 500 hours, the coated film is peeled compulsory by knife. The numerical value in Table 1 are the measured value of width of peeling from the cross cut line.

EXAMPLE 4

By the same procedure as in Example 3 except using 32 parts of phenolic hydroxyl group containing modified resin [A-2] obtained in Example 2, the powder coating composition [a-2] and the coated test piece of Example 4 are obtained.

COMPARATIVE EXAMPLE 1

Figure 2:
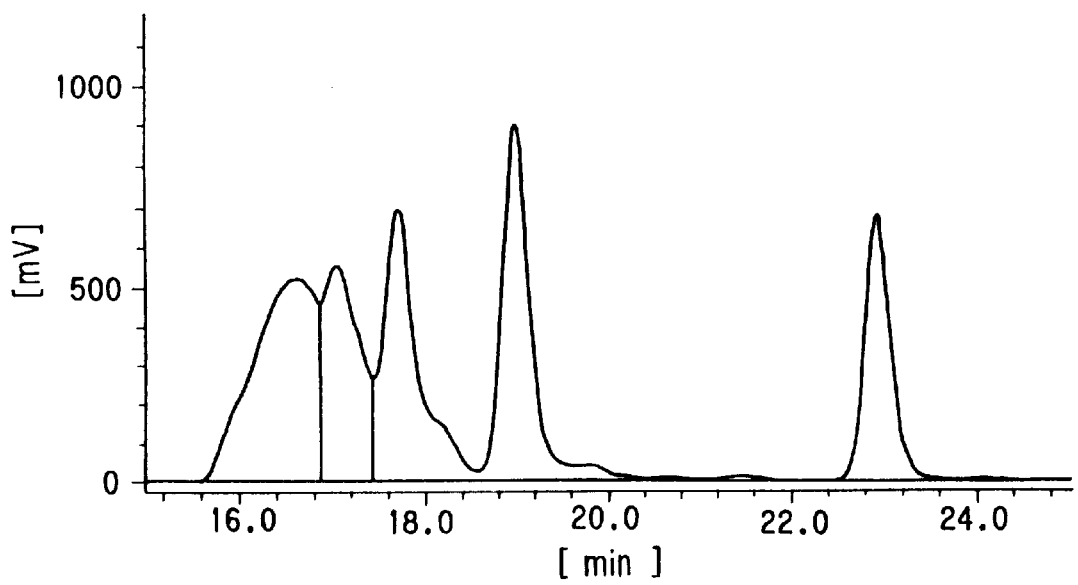
FIG. 2 is a GPC chart of the modified phenolic hydroxyl group containing resin used in the Comparative Example 1.

By the same procedure as in Example 3 except using 27 parts of EPICURE-127 (product of YUKA SHELL EPOXY; hydroxide equivalent is 365 g/eq, softening point is 87° C., residue of bisphenol A is 16.7% there was), obtained the coated test piece of Comparative Example 1. GPC chart of phenolic hydroxyl group containing modified resin used in this comparative Example is shown in FIG. 2.

COMPARATIVE EXAMPLE 2

By the same procedure as in Example 3 except using 53 parts of TH4100 (product of TOHTO KASEI; hydroxide equivalent is 721 g/eq, softening point is 110° C., residue of bisphenol A is 5.5% there was), obtained the coated test piece of Comparative Example 2.

TABLE 1

|  | Example | | Compar. Ex. | |
| --- | --- | --- | --- | --- |
|  | 3 | 4 | 1 | 2 |
| Appearance | ◯ | ◯ | X | Δ |
| Impact Resistance | | | | |
| 0° C. | 1.6 | 1.7 | 0.9 | 1.3 |
| −20° C. | 1.5 | 1.5 | 0.7 | 1.0 |
| Cathode peeling | 6~8 | 5~7 | 10~12 | 8~10 |
| Corrosion resistance | 2 | 2 | 8 | 5 |

EXAMPLE 5

In a reaction vessel which equipt with a stirrer, a thermometer, dropping apparatus and the reacted water recovery apparatus, 130 parts of phenolic hydroxyl group containing modified resin [A-2] obtained in Example 2 and 260 parts of epichlorohydrin is added. After the resin is dissolved under the vacuum condition, the inside temperature of vessel is raised to 80° C., 18.6 parts of 49% aqueous solution of sodium hydroxide is dropped for 2 hours. During this 2 hours, the temperature of reaction system is kept at 80 to 85° C., and water generated by reaction and water contained in aqueous solution of sodium hydroxide is removed from the reacting system as an azeotropic mixture with epichlorohydrin, and vapor is condensed; epichlorohydrin is recycled to the system.

After the dropping of aqueous solution of sodium hydroxide, the inside pressure of vessel is returned to the atmospheric pressure, aged for 2 hours and excess epichlorohydrin is vaporized off. To the mixture of generated epoxy resin and sodium hydroxide, 245 parts of MIBK (methylisobutylketone) and 150 parts of water are added so as to dissolve the contents, settled down for 30 minutes, then water are layer is separated. Further, 14.1 parts of 20% aqueous solution of sodium hydroxide is added and refining reaction is carried out for 2 hours at 80 to 85° C. After the reaction, 40 parts of MIBK and 150 parts of water are added and the temperature raised to 80° C. Then after settling down for 30 minutes the water layer are separated. The contents is neutralized by adding 5 parts of aqueous solution of 10% sodium phosphate and 100 parts of water and separated, further rinsed by 100 parts of water, separated and dehydrated. After being filtered, MIBK is vaporized off and the solid epoxy resin [B-1] is obtained.

Figure 6:
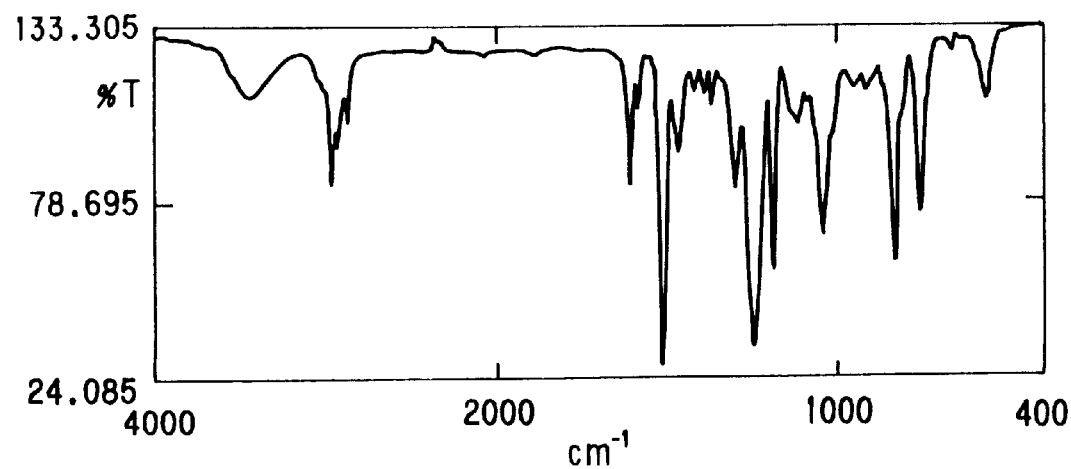
FIG. 6 is a chart indicating Infra Red spectrum of this solid epoxy resin [B-1].

GPC chart of its obtained solid epoxy resin is shown in FIG. 4, and the chart of infra red spectrum chart is shown in FIG. 6. Further, the epoxy equivalent of the resin, softening point, amount of n=0, n=1 and n=2 contents, number-average molecular weight (Mn), weight-average molecular weight (Mw), Mw/Mn and glass transition temperature are summarized in Table 2.

The measuring method of each item in Table 2 is conformed to following methods.

Epoxy equivalent; Measured by JIS K-7236

Number-average molecular weight (Mn), weight-average molecular weight (Mw), Mw/Mn;

By GPC analysis by following condition, Contents of n=0, n=1 and n=2 components are calculated from area percentage.

Analytical condition of GPC

Apparatus; TOSOH, HLC-802A type

Solution; THF

Column; TOSOH, 1 section of TSK-GEL and G2000H, 1 piece of G3000H

And 1 piece of G4000H

Temperature of column; 40° C.

Moving bed; THF

Flow rate; 1.5 ml/min

Detector; TOSOH, R1-8 type

Calibration curve; DGEBA

Glass transition temperature (Tg); Analyzed by Differential scanning calorimeter (DSC) by the condition of temperature raising rate 10° C./min.

EXAMPLE 6

In the same reaction vessel as in Example 5, 150 parts of modified phenolic hydroxyl group containing resin [A-1] obtained in Example 1and 330 parts of epichlorohydrin are introduced. After the resin is dissolved, the temperature of system is raised to 80° C. 16.2 parts of 49% aqueous solution of sodium hydroxide is dropped for 2 hours.

Similarly to Example 5, after maturing reaction, refining reaction, neutralization, rinsing, dehydration and filtration MIBK is vaporized off. Thus the solid epoxy resin [B-2] is obtained. The physical properties are shown in Table 2.

EXAMPLE 7

In a reaction vessel which equipt with a stirrer, a thermometer and cooling tube, 221.8 parts of bisphenol A and 224.9 parts of 10% aqueous solution of sodium hydroxide are added and the temperature is raised to 60° C. After the resin is dissolved, 50 parts of epichlorohydrin is dropped for 30 minutes and then reacted at 90° C. for 1.5 hours. 411 parts of methylisobutylketone (MIBK) is added and contents is dissolved, further 853 parts of 5% aqueous solution of sodium hydroxide is added and dissolved, and water layer is separated. Resin layer is neutralized by phosphoric acid, rinsed by fresh water and dehydrated. After filtration, solution is evaporated off and the phenolic hydroxyl group containing modified resin [A-3] whose phenolic hydroxyl equivalent is 402 g/eq and softening point is 95° C. is obtained.

In a reaction vessel which equipt with a stirrer, a thermometer, dropping apparatus and the reacted water recovery apparatus, 130 parts of phenolic hydroxyl group containing modified resin [A-3] obtained as above and 220 parts of epichlorohydrin and 44 parts of diethyleneglycoldimethylether are added. After the resin is dissolved under vacuum condition, the inside temperature of the vessel is raised to 80° C., 18.53 parts of 49% aqueous solution of sodium hydroxide is dropped for 1 hour. During this 1 hour, the temperature of reacting system is kept at 80 to 85° C., and water generated by reaction and water contained in aqueous solution of sodium hydroxide is removed from the reaction system as a mixture of azeotropy with epichlorohydrin, and vapor is condensed, then epichlorohydrin is returned to the system. After the dropping of aqueous solution of sodium hydroxide, the inside pressure of vessel is returned to the atmospheric pressure, aged for 2 hours and excess epichlorohydrin is vaporized off. To the mixture of generated epoxy resin and sodium hydroxide, 275 parts of MIBK and 200 parts of water are added so as to dissolve the contents, settled down for 30 minutes, then water layer is separated. Further, 5.9 parts of 20% aqueous solution of sodium hydroxide is added and refining reaction is carried out for 2 hours at 80 to 85° C. After the reaction, 200 parts of water added and the temperature raised to 80° C. Then settled down for 30 minutes and water layer is separated. The contents is neutralized by adding 5 parts of aqueous solution of 10% sodium phosphate and 200 parts of water and separated, further rinsed by 100 parts of water, separated and dehydrated. After filtrated, MIBK is vaporized off and the solid epoxy resin [B-3] is obtained. The obtained physical properties of epoxy resin are shown in Table 2.

COMPARATIVE EXAMPLE 3

The physical properties of conventional solid type epoxy resin YD-012 (product of TOHTO KASEI) which is on the market produced by taffy method of bisphenol A and epichlorohydrin are shown in Table 2.

COMPARATIVE EXAMPLE 4

The physical properties of conventional solid type epoxy resin YD-013 (product of THOTO KASEI) which is on the market produced by taffy method of bisphenol A and epichlorohydrin are shown in Table 2. FIG. 5 is the GPC chart of this resin.

The physical features of epoxy resin of Examples 5, 6 and 7, and conventional epoxy resin on the market disclosed in Comparative Example 3 and 4 are shown in Table 2.

TABLE 2

| analytical items | Example | | | Compar. Ex. | |
|---|---|---|---|---|---|
| | 5 | 6 | 7 | 3 | 4 |
| Epoxy equivalent g/eq | 608 | 847 | 653 | 648 | 853 |
| Softening point ° C. | 84 | 95 | 79 | 80 | 91 |
| GPC | | | | | |
| n = 0 contents % | 0 | 0 | 0 | 5.8 | 3.5 |
| n = 1 contents % | 0 | 0 | 11.4 | 8.8 | 6.3 |
| n = 2 contents % | 38.9 | 20.6 | 16.9 | 10.8 | 7.9 |
| Mn | 1310 | 1740 | 1288 | 1223 | 1640 |
| Mw | 1810 | 2730 | 1730 | 2156 | 3320 |
| Mw/Mn | 1.38 | 1.57 | 1.34 | 1.76 | 2.02 |
| Glass transition temperature | 46 | 58 | 48 | 41 | 47 |

EXAMPLE 8

100 parts of epoxy resin [B-1] obtained in Example 5, 3.8 parts of dicyandiamide, 0.2 part of 2-methylimidazole, 40 parts titanium oxide and 0.5 parts of MODAFLOW as a flow controlling agent are blended in dry condition and melt mulled by an extruder (IKEGAI TEKKO; PCM-30). After cooled down, milled to fine particles and the powder coating [b-1] is obtained.

The melting and milling conditions of extruder are;
Cylinder 1cooling
Cylinder 2; 80° C.
Cylinder 3; 90° C.
Head; 110° C.
Main screw; 200 rpm
Feeding screw; 20 rpm The obtained powder coating is coated by powder electrostatic painting method over the surface of steel plate (150×70×0.8 mm) whose surface is processed by sand blasting process and baked in 200° C. heated oven, then a coated test piece which has about 100 μm film thickness is obtained. A blocking resistance and a flowability of powder coating, a luster of coated film, a adhesive strength, Erichsen value and an impact resistance of the test piece are evaluated, and the results are shown in Table 3.

The evaluating method of powder coating and cured coated film are as follows.

Resistance to blocking; Powder coating is placed in thermostat of 40° C. for 10 days, then the state of blocking is inspected. (◯; flowable, X; not flowable)

Flowability; 0.5 g of powder coating is picked up and a tablet of 13 mm diameter is prepared by 100 kg/cm2 pressure at room temperature. This tablet is placed on a steel plate having an inclination of 30 degrees and is left in 200° C. controlled oven. The distance that the coating flows down, and the flowability is calculated by following numerical equation.

flowability=[distance of flow (mm)–13 (mm)]/thickness of tablet(mm)

Gloss; Gloss(%) is measured by JIS K 5400, 6.7 (60 degrees mirror reflecting)

Adhesive strength; After a coated test piece is dipped into water and heat treated at 100° C. for 2 hours, 100 squares checker mark of lmm X lmm square are cut on the coated surface by a knife and cellophane tape is stuck, then the stuck tape is removed rapidly. Number of squares are measured by naked eyes.

Erichsen value, Using Erichsen tester, ponch is pushed out 10 mm and pinholes on coated surface is observed. (◯; no pinhole, X; pinholes can be observed)

Resistance to impact Measured by JIS K-5400 method. By DU'PONT impact tester, ½ inch hammer and corresponding table are used and a weight of 1 kg is dropped down from 50 cm height, and cracks and peeling are observed by naked eyes of inspectors. (◯; normal, X; cracks and peelings can be observed on the coating surface)

EXAMPLE 9

By the same blending, mulling, cooling and milling procedure to Example 8 except using the epoxy resin [B-2] obtained in Example 6 the powder coating [b-2] is obtained. The obtained powder coating is coated by powder electrostatic painting method and baked, and the coated test piece of Example 9 is obtained. This test piece is evaluated likely to Example 8, and the results are shown in Table 3.

EXAMPLE 10

By the same blending, mulling, cooling and milling procedure to Example 8 except using the epoxy resin [B-3] obtained in Example 7 the powder coating [b-3] is obtained. The obtained powder coating is coated by powder electrostatic painting method and baked, and the coated test piece of Example 10 is obtained. This test piece is evaluated likely to Example 8, and the results are shown in Table 3.

COMPARATIVE EXAMPLE 5

By the same blending, mulling, cooling and milling procedure to Example 8 except using the epoxy resin obtained in Comparable Example 3 the powder coating is obtained. The obtained powder coating is coated by powder electrostatic painting method and baked, and the coated test piece of Comparative Example 5 is obtained.

COMPARATIVE EXAMPLE 6

By the same blending, mulling, cooling and milling procedure to Example 8 except using the epoxy resin obtained in Comparable Example 4 the powder coating is obtained. The obtained powder coating is coated by powder electrostatic painting method and baked, and the coated test piece of Comparative Example 6 is obtained.

The evaluation results of coating film of powder coating of Examples 8, 9 and 10, and Comparative Example 5 and 6 are shown in Table 3.

TABLE 3

| evaluation items | Example | | | Compar. Ex. | |
|---|---|---|---|---|---|
| | 8 | 9 | 10 | 5 | 6 |
| blocking resistance | ◯ | ◯ | ◯ | X | ◯ |
| Flowability | 6.0 | 5.0 | 6.0 | 5.0 | 3.0 |
| gloss % | 99 | 98 | 99 | 90 | 92 |
| adhesive strength | 100 | 100 | 100 | 85 | 82 |
| Erichsen value | ◯ | ◯ | ◯ | X | ◯ |
| impact resistance | ◯ | ◯ | ◯ | X | ◯ |

EXAMPLE 11

423.1 parts of epoxy resin [B-2] obtained by Example 6,31.2 parts of bisphenol A, 50.5 parts of methylisobutylketone and 0.5 part of triethylamine are added to a 1 liter size glass separable flask equipt with a stirrer, a thermometer, a nitrogen gas introducing pipe and a condenser. With constant stirring under nitrogen gas flow, the temperature of contents in flask is raised to 160° C., and further reacted for 2 hours at 150~160° C. After the reaction, the temperature is raised to 200° C. for 2 hours and xylene is vaporized off from the system. When the temperature reached to 200° C., contents are removed, thus the solid epoxy resin [C-1] whose epoxy equivalent is 2140 g/eq (value of solid portion), non volatile portion is 99.8% and solution viscosity (diluted to 40 wt % resin concentration by n-butylcarbitol and measured at 25° C. by Gardner Holdt viscometer is Z2~Z3 is obtained. In Examples hereafter the solution viscosity is measured in the same way

EXAMPLE 12

The same experiment to Example 11 is made except using 423.1 parts of epoxy resin [B- 2] obtained in Example 6, 36.1 parts of bisphenol A, 51.1 parts methylisobutylketone and 0.5 parts of triethylamine, and the solid epoxy resin [C-2] whose epoxy equivalent is 2680 g/eq (value of solid portion), non volatile portion is 99.5% and solution viscosity is Z4~Z5 is obtained.

EXAMPLE 13

The same experiment to Example 11 is made except using 423.1 parts of epoxy resin [B-2] obtained in Example 6, 38.2 parts of bisphenol A, 51.3 parts of methylisobutylketone and 0.5 parts of triethylamine, and the solid epoxy resin [C-3] whose epoxy equivalent is 3180 g/eq (value of solid portion), non volatile portion is 99.4% and solution viscosity is Z6 is obtained.

Figure 7:
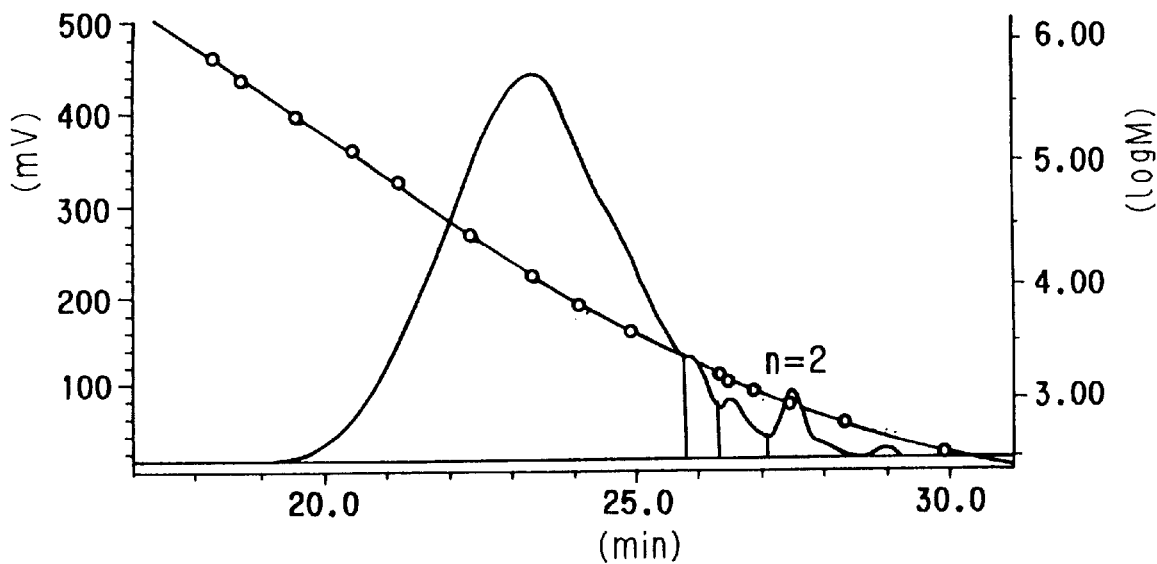
FIG. 7 is a GPC chart of the solid epoxy resin [C-3] obtained in Example 13.
Figure 9:
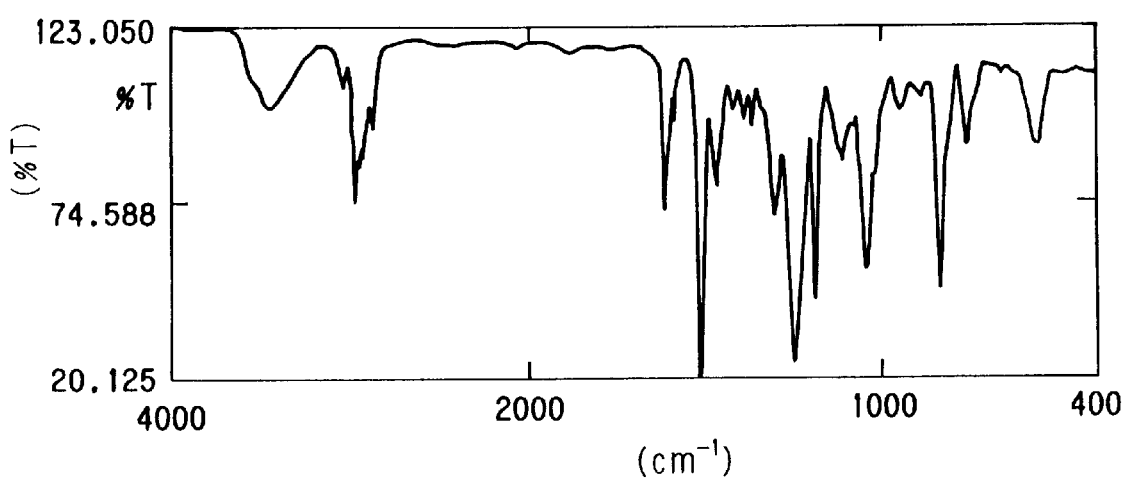
FIG. 9 is a chart indicating Infra Red spectrum of this solid epoxy resin [C-3].

GPC chart of this solid epoxy resin is shown in FIG. 7, and Infra red spectrum chart is shown in FIG. 9.

EXAMPLE 14

142.0 parts of the phenolic hydroxide group containing modified resin [A-1] obtained in Example 11, 423.1 parts of the epoxy resin [B-2] obtained in Example 6 are added together with 62.8 parts of methylisobutylketone into a 1 liter size glass separable flask which equipts with a stirrer, a thermometer, a nitrogen gas introducing pipe and a condenser. The temperature is raised to 120° C., and resin is completely dissolved in MIBK. Then, 0.5 parts of trimethyl amine is added and reacted likely to Example 11. The solid epoxy resin [C-4] whose epoxy equivalent is 1960 g/eq (value of solid portion), non volatile portion is 99.6% and solution viscosity is Z3 is obtained.

EXAMPLE 15

The same experiment to Example 11 is made except using 171.3 parts of modified phenolic hydroxide group containing resin [A-1] obtained in Example 1, 423.1 parts of epoxy resin [B-2] obtained in Example 6, 66.0 parts of methylisobutylketone and 0.5 parts of triethylamine, and the solid epoxy resin [C-5] whose epoxy equivalent is 2,440 g/eq (value of solid portion), non volatile portion is 99.5% and solution viscosity is Z5~Z6 is obtained.

EXAMPLE 16

The same experiment to Example 11 is made except using 184.8 parts of phenolic hydroxide group containing modified resin [A-1] obtained in Example 1, 423.1 parts of epoxy resin [B-2] obtained in Example 6, 67.5 parts of methylisobutylketone and 0.5 parts of triethylamine, and the solid epoxy resin [C-6] whose epoxy equivalent is 2,750 g/eq (value of solid portion), non volatile portion is 99.4% and solution viscosity is Z6 is obtained.

EXAMPLE 17

The same experiment to Example 11 is made except using 400 parts of epoxy resin [B-2] obtained in Example 6, 49.3 parts of bisphenol A, 49.9 parts of xylene and 0.5 parts of n-butyltriphenylphosphoniumbromide, and the solid epoxy resin [C-7] whose epoxy equivalent is 2,720 g/eq (value of solid portion), non-volatile portion is 98.0% and solution viscosity is Z5~Z6 is obtained.

EXAMPLE 18

The same experiment to Example 1 is made except using 142.1 parts of phenolic hydroxide group containing modified resin [A-1] obtained in Example 1, 300 parts of epoxy resin [B-I] obtained in Example 6, 49.1 parts of xylene and 0.5 parts of triethylamine, and the solid epoxy resin [C-8] whose epoxy equivalent is 2,650 g/eq (value of solid portion), non-volatile portion is 98.5% and solution viscosity is Z5~Z6 is obtained.

COMPARABLE EXAMPLE 7

Figure 8:
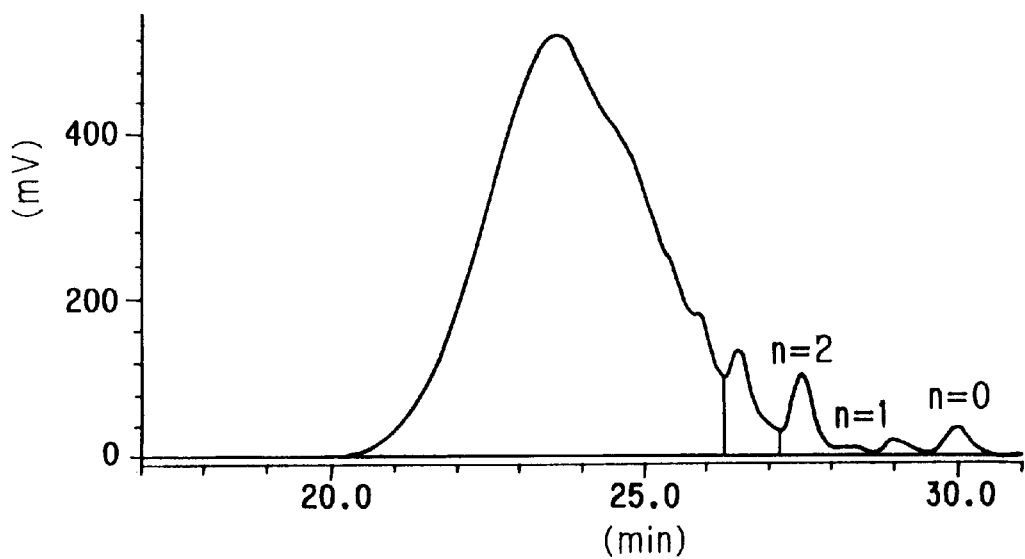
FIG. 8 is a GPC chart of the solid epoxy resin of Comparative Example 7.

As a solid type epoxy resin of Comparative Example [C' 1], EPOTHOTO YD-909 (product of TOHTO KASEI, BPA type epoxy resin; Epoxy equivalent is 2,200 g/eq, number average molecular weight is 6,100) is selected. FIG. 8 is the GPC chart of this solid epoxy resin.

COMPARABLE EXAMPLE 8

1,720 parts of YD-8125 (product of TOHTO KASEI, molecular distillation BPA type liquid epoxy resin; Epoxy equivalent is 172 g/eq, content of α-diol is 0.8 meq/100 g, hydrolyzable chlorine contents is 0.01 wt %), 992 parts of BPA, 300 parts of xylene and 0.4 parts of triethylamine are added to the same reaction apparatus of Example 11. With constant stirring under nitrogen gas flow, the temperature of contents in flask is raised to 160° C., and further reacted for 2 hours at 160~170° C. After the reaction, the temperature is raised to 200° C., for 2 hours and xylene is vaporized off from the system. When the temperature reached to 200° C., contents are removed, thus the solid type epoxy resin [C' 2] whose epoxy equivalent is 2,450 g/eq (value of solid portion), non-volatile portion is 96%, solution viscosity is Z3~Z4 and number average molecular weight is 7,100 is obtained.

COMPARATIVE EXAMPLE 9

450 parts of YD-019 (product of TOHTO KASEI BPA type epoxy resin; epoxy equivalent is 2,800 g/eq, number average molecular weight is 4,000) and 150 parts of xylene are added to a 2 liter size glass separable flask which has same function to that of Example 11, and the temperature of contents in flask is raised to 120° C. The resin is dissolved in 90 minutes.

After cooled down below 100° C., 600 parts of ethanol is added and stirred for 30 minutes, contents is transferred to 2 liter size separating funnel and settled down until the content completely separate to two layers. Then, xylene solution layer which locates lower is put back to the separable flask, and rinsed by methanol for 5 times. Xylene is removed using rotary evaporator, and the solid epoxy resin [C' 3] is obtained, whose epoxy equivalent is 3,500 g/eq (value of solid portion), non volatile component is 99%,and softening point is 140° C. and a number average molecular weight is 5,700.

EXAMPLE 19~26

The solid epoxy resins [C-1]~[C-8] which obtained in Examples 11~18 are used. 401 parts of each resins are dissolved in 599 parts of xylene and 600 parts of cyclohexanone and solutions of 25 wt % resin concentration are obtained. To each solution, 100 parts of HITANOL 4010 (resol type phenol resin; product of HITACHI CHEMICAL) and 2 parts of 85% phospholic acid are added and stirred, and uniform coatings are obtained. The obtained coatings are coated over the surface of aluminum plates of 0.3 mm thickness by bar coater, baked at 200° C. for 10 minutes. Thus the test pieces of 10 μm thickness coated film of Example 19~26 are obtained.

COMPARATIVE EXAMPLE 10~12

The solid epoxy resins [C' 1]~[C' 3] which were obtained in Comparative Examples 7~9 are used. 417 parts of each resins are dissolved in 583 parts of xylene and 600 parts of cyclohexanone and solutions of 25 wt % resin concentration are obtained. To each solution, 100 parts of HITANOL 4010 and 2 parts of 85% phosphoric acid are added and stirred, and uniform coatings are obtained. The obtained coatings are coated over the surface of aluminum plates of 0.3 mm thickness, baked at 200° C. for 10 minutes. Thus the test pieces of 10 μm thickness coated film of Comparative Examples 10–12 are obtained.

The physical properties of bisphenol type epoxy resin obtained in Examples 11~18 and Comparative Examples 7–9 are shown.

Further, the physical properties of bisphenol type epoxy resin obtained in Example 19~26 and Comparative Examples 10~12 are shown in Table 5.

The analytical method of epoxy resin and evaluation method of coated film are illustrated as follows.
1) Epoxy equivalent; Measured by JIS K 7236
2) Number-average molecular weight; GPC method Apparatus: HPLC-8020 (product of TOHSO Co., Ltd.)
Column: 2 pieces of GMHXL+1 piece of G2000XL (product of TOHSO Co., Ltd.)
Temperature: 35° C. Flow rate: 1 ml/min
Detector: R1 Calibration curve: polystyrene 3) Solution viscosity;

Measured by Gardner Holdt viscosimeter at 25° C.

4) Potassium permanganate consumption;

Specimen is dissolved in cyclohexanone and a varnish of 25 wt % solid concentration is prepared. This varnish is coated over the surface of 0.3 mm thickness aluminum plate using a bar coater so that the thickness of dry coated film is 10 μm, dried up in 200° C. oven for 10 minutes, and thus prepared a test piece is prepared. The test piece is put into a pressure bottle and city water which is treated by activated carbon is poured so that the contact ratio of test piece to water is 1 ml/5 $cm^2$. The pressure bottle is sealed and placed into a retort sterilizing vessel and sterilized at 125° C. for 1 hour. After cooled down, potassium permanganate consumption of this water is measured by the method disclosed in food and health law of Japan.

5) Adhesive strength;

100 squares checker mark of 1 mm×1 mm square are cut on the coated surface by a knife and a cellophane tape is stuck, then the stuck tape is removed rapidly. Number of squares are measured by naked eyes.

6) Bending processing;

The coated plate is bent as the coated side to be the surface side and pressed by 20 kg/$cm^2$ pressure at 20° C. Then electric current is charged to the bent portion using an enamel meter (electric tester) and ampere is measured. Degree of damage of the coated surface is ranked to 3 levels based on the measured value of ampere.

○: value of ampere is smaller than 1 mA

Δ: value of ampere is from 1 to 5 mA

X: value of ampere is bigger than 5 mA

7) Retort resistance;

The coated plate is treated by retort at 125° C. for 30 minutes and the whitening of coated film is inspected by naked eyes and ranked to following 3 levels.

○: not whitened
Δ: partially whitened
X: whole surface is whitened

8) Maintenance of flavour;

The test piece whose both surface is coated are prepared. The test piece is put into a pressure bottle and city water which is treated by activated carbon is poured so that contact ratio of test piece to water is 1 ml/5 cm². The pressure bottle is sealed and placed into a retort sterilizing vessel and sterilized at 125° C. for 1 hour. After cooled down, the treated water is evaluated sensually in comparison with the water by blank test.

○: no change
Δ: slightly changed
X: remarkably changed

The properties solid epoxy resins [C-1]~[C-8] obtained in Examples 11~18 and solid epoxy resins [C' 1]~[C' 3] obtained in Comparative Examples are shown in Table 4.

Table 4

TABLE 4

| | epoxy resin | epoxy equivalent eq. g/eq | Solution viscosity G-H/25° C. | Molecular Weight Mn | KMnO₄ Consumption mg O/L |
|---|---|---|---|---|---|
| Example | | | | | |
| 11 | C-1 | 2,140 | Z2~Z3 | 6,000 | 1.6 |
| 12 | C-2 | 2,680 | Z4~Z5 | 7,600 | 0.9 |
| 13 | C-3 | 3,180 | Z6 | 8,600 | 0.9 |
| 14 | C-4 | 1,960 | Z3 | 5,700 | 2.6 |
| 15 | C-5 | 2,440 | Z4~Z5 | 7,100 | 1.9 |
| 16 | C-6 | 2,750 | Z6 | 7,900 | 1.7 |
| 17 | C-7 | 2,720 | Z5~Z6 | 7,500 | 2.1 |
| 18 | C-8 | 2,650 | Z5~Z6 | 7,400 | 2.6 |
| Copar. Ex. | | | | | |
| 7 | C' 1 | 2,200 | Z4 | 5,700 | 21.0 |
| 8 | C' 2 | 2,450 | Z4 | 6,400 | 14.1 |
| 9 | C' 3 | 3,500 | Z4~Z5 | 8,200 | 7.0 |

The physical properties of coated film of Example 19~26 and Comparative Examples 10~12 are shown in Table 5.

TABLE 5

| | epoxy resin | adhesive strength | bending resistance | retort resistance | maintenance of flavor |
|---|---|---|---|---|---|
| Example | | | | | |
| 19 | C-1 | 100 | ○ | ○ | ○ |
| 20 | C-2 | 100 | ○ | ○ | ○ |
| 21 | C-3 | 100 | ○ | ○ | ○ |
| 22 | C-4 | 100 | Δ | Δ | ○ |
| 23 | C-5 | 100 | ○ | ○ | ○ |
| 24 | C-6 | 100 | ○ | ○ | ○ |
| 25 | C-7 | 100 | ○ | ○ | ○ |
| 26 | C-8 | 100 | ○ | ○ | ○ |
| Compar. Ex. | | | | | |
| 10 | C' 1 | 100 | Δ | Δ | X |
| 11 | C' 2 | 100 | ○ | ○ | Δ |
| 12 | C' 3 | 100 | ○ | ○ | Δ |

Possibility for Practical Industrial Use

As clearly understood from the Examples, the modified phenolic hydroxyl group containing resin [A] contains less volatile composition compared with the conventional well known modified resin, and the excellent coated film which is superior at impact resistance and corrosion resistance can be prepared from the curable composition thereof [a]. And the solid epoxy resin [B] prepared by the epoxidation of said modified resin by epihalohydrin has more sharp distribution of molecular weight and higher glass transition temperature compared with the conventional well known modified resin, and has an excellent blocking resistance. Further, a coated film which has excellent adhesive strength, bending ability and impact resistance can be fabricated from the curable resin composition thereof [b]. Furthermore, the solid epoxy resin [C] obtained by addition polymerization reaction between said solid epoxy resin and difunctional phenols can reduce the potassium permanganate consumption by retort extraction remarkably in comparison with the conventional well known solid epoxy resins. Still further, from the curable composition thereof [c] a coated film which is superior at maintenance of flavour can be fabricated without spoiling adhesive strength, bending processing and retort resistance, and can provide a coating composition which is especially useful as the inner surface coating of a can for beverage.

We claim:

1. An epoxy resin which is solid at room temperature and which comprises the product of epoxidizing a modified phenolic hydroxyl-containing resin having a low free difunctional phenol content comprising a resin of formula (1)

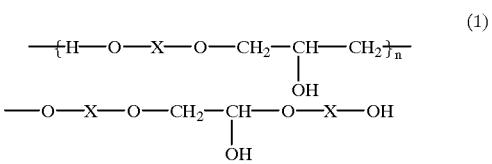

wherein X represents a residue of difunctional phenol and n is 0 or a positive integer; and wherein the X's at different positions may be the same or different;

said resin having a phenolic hydroxyl group equivalent of from 300 to 1200 q/eg; and, wherein residues of unreacted difunctional phenol is less than 5% by weight of the resin, with an epihalohydrin, said epoxy resin having an epoxy equivalent in the range of 450 to 2500 g/eq.

2. The epoxy resin which is solid at room temperature according to claim 1 further reacted with difunctional phenol to provide an epoxy equivalent of from 1,500 to 60,000 g/eq and a number average molecular weight of from 3,000 to 15,000.

3. The room temperature solid epoxy resin of claim 2, characterized by a potassium permanganate consumption value smaller than 5 mg O/L, wherein said value is measured on extracted water which is prepared by adding, by a ratio of 1 ml water to 5 cm² area of uncured dry film having a thickness of about 10 μm and heat treated at 125° C. at high pressure for 1 hour in a sealed bottle.

* * * * *

UNITED STATES PATENT AND TRADEMARK OFFICE
CERTIFICATE OF CORRECTION

PATENT NO. : 6,046,284
DATED : April 4, 2000
INVENTOR(S) : Shuya Shinohara, Mobuhisa Saitoh, Yasuyuki Takeda, Masayoshi Hanafusa, Hidenori Nozawa It is certified that error appears in the above-indentified patent and that said Letters Patent is hereby corrected as shown below:

In the Abstract and in col. 3, lines 40-48 please replace the first line of the formula (1) with the following:

Col. 4, line 58, please change, "afore# mentioned" to --aforementioned--.

Claim 1, column 20, lines 32-38, please replace the first line of formula (1) with the following:

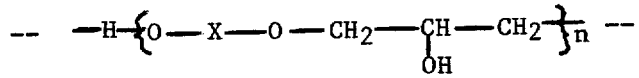

Signed and Sealed this

Thirtieth Day of January, 2001

Q. TODD DICKINSON

*Attest:*

*Attesting Officer*    *Director of Patents and Trademarks*